(12) United States Patent
Kobayashi et al.

(10) Patent No.: US 11,100,365 B2
(45) Date of Patent: Aug. 24, 2021

(54) APPARATUS AND METHOD FOR INTERACTIVELY VIEWING AND CLUSTERING DATA SEGMENTS FROM LONG DATA RECORDINGS

(71) Applicant: Keysight Technologies, Inc., Santa Rosa, CA (US)

(72) Inventors: Naoki Kobayashi, Machida (JP); Masaharu Goto, Hanno (JP)

(73) Assignee: Keysight Technologies, Inc., Santa Rosa, CA (US)

( * ) Notice: Subject to any disclaimer, the term of this patent is extended or adjusted under 35 U.S.C. 154(b) by 86 days.

(21) Appl. No.: 16/459,425

(22) Filed: Jul. 1, 2019

(65) Prior Publication Data

US 2021/0004639 A1    Jan. 7, 2021

(51) Int. Cl.
*G06F 3/0482* (2013.01)
*G06K 9/62* (2006.01)

(52) U.S. Cl.
CPC ......... *G06K 9/6219* (2013.01); *G06F 3/0482* (2013.01); *G06K 9/628* (2013.01)

(58) Field of Classification Search
None
See application file for complete search history.

(56) References Cited

U.S. PATENT DOCUMENTS

| | | |
|---|---|---|
| 9,558,572 B2 | 1/2017 | Deng |
| 10,013,641 B2 | 7/2018 | Helfman et al. |
| 2008/0120292 A1* | 5/2008 | Sundaresan ........... G06F 16/951 |
| 2014/0040269 A1* | 2/2014 | Sundaresan ........... G06F 16/355 |
| | | 707/737 |
| 2016/0110442 A1* | 4/2016 | Williams ........... G06Q 10/0637 |
| | | 707/737 |
| 2019/0220471 A1* | 7/2019 | Mota Toledo ......... G06N 7/005 |
| 2019/0311301 A1* | 10/2019 | Pyati .................... G06F 16/901 |

(Continued)

FOREIGN PATENT DOCUMENTS

JP     2009042962 A     2/2009

OTHER PUBLICATIONS

Bartolini, et al., Adaptively browsing image databases with PIBE, Multimed Tools Appl (2006) 31, Sep. 30, 2006, Springer Science + Business Media, LLC 2006, ages 269-286.

(Continued)

*Primary Examiner* — Idowu O Osifade

(57) ABSTRACT

A method for operating a data processing system and computer readable medium causing a data processing system to execute that method are disclosed. The method includes causing the data processing system to receive a plurality of first EDSs classified into a plurality of first clusters and a first RDS for each of the plurality of first clusters and displaying, a first display for each of the first clusters and a RDS for each of the first clusters. The data processing system receives information from a user specifying one or more of the first clusters to be further clustered to arrive at a specified number of second clusters into which the specified one or more first clusters are to be classified, and performing a second clustering on the selected clusters. The method also includes displaying a second display that includes a plurality of second EDSs, classified into the second clusters.

20 Claims, 6 Drawing Sheets

(56) References Cited

U.S. PATENT DOCUMENTS

2020/0258632 A1\* 8/2020 Soni ..................... G06K 9/6215

OTHER PUBLICATIONS

Zhang, et al., Sensor Fault Detection for Industrial Systems Using a Hierarchical Clustering-based Graphical User Interface, 2012 IEEE International Conference on Multisensor Fusion and Integration for Intelligent Systems (MFI), Sep. 13-15, 2012, pp. 389-394Hamburg, Germany.
Segaran, Programming Collective Intelligence, Building Smart Web 2.0 Applications, 2007, O'Reilly Media, Inc., Sebastopol, CA.
Keysight Technologies, Inc.,, InfiniiVision 3000A X-Series Oscilloscopes, pp. 1-6.
Yokogawa Electric Company, Standalone MW100, pp. 1-7.
Keysight Technologies, Inc., CX3300 Series Device Current Waveform Analyzer, pp. 1-3.
Wikipedia, Spectrogram, pp. 1-6.

\* cited by examiner

APPARATUS AND METHOD FOR INTERACTIVELY VIEWING AND CLUSTERING DATA SEGMENTS FROM LONG DATA RECORDINGS

BACKGROUND

Data recording systems are now capable of recording quantities of data that are so large that the time to search the recorded data by reading in the stored data serially becomes significant. Data sets in excess of a terabyte are routinely recorded. These data sets can be the result of monitoring a stream of signal values, images, or other quantities of interest. In many applications of interest, the data stream is composed of a number of signals of interest that are separated from one another by background data. In U.S. patent application Ser. No. 16/373,343 filed on 2 Apr. 2019, a system for preprocessing such a data stream without detailed prior knowledge of the signals of interest is disclosed. The preprocessing produces a database that includes clusters of similar signals. Each cluster is characterized by a representative element of that cluster, the number of elements in the cluster, and other useful information. While this system significantly reduces the amount of data that must be comprehended to understand the contents of the data stream, understanding the data stream in terms of the underlying clusters that are of importance to a user still presents challenges.

SUMMARY

The present invention includes a method for operating a data processing system and computer readable medium causing a data processing system to execute that method. The method operates on a data processing system having a user interface and a display. The method includes causing the data processing system to receive a plurality of first extracted data segments (EDSs) classified into a plurality of first clusters and a first reference data segment (RDS) for each of the plurality of first clusters and displaying, on a region of the display, a first display for each of the plurality of first clusters and a RDS for each of the plurality of first clusters. The method also includes receiving information from a user, specifying one or more of the first clusters to be further clustered to arrive at a specified number of second clusters into which the specified one or more first clusters is to be classified, and performing a second clustering of the one or more first clusters. The method also includes displaying, on the first display region, a second display that includes a plurality of second EDSs classified into the second clusters as a result of the second clustering.

In one aspect, the first display includes a number of EDSs belonging to each of the plurality of first clusters.

In another aspect, the second clustering includes a hierarchical clustering method.

In another aspect, the first display includes, for each of the plurality of first clusters, a first RDS of each of the plurality of first clusters and a number of EDSs belonging to each of the plurality of first clusters includes arranging and displaying the first RDS and the number of EDSs in a format of a plurality of tiles horizontally for the plurality of first clusters.

In another aspect, each of the tiles is characterized by a horizontal display range and a vertical display range and where the horizontal and vertical display ranges are set independently for each of the tiles such that the first RDS displayed in that tile occupies substantially all of the horizontal and vertical display range.

In another aspect, the first display includes, for each of the plurality of first clusters, a first RDS of each of the plurality of first clusters and a number of EDSs belonging to each of the plurality of first clusters includes arranging and displaying the first RDS and the number of EDSs in a format of a plurality of list formatted tiles vertically arranged for the plurality of first clusters.

In another aspect, each of the list formatted tiles has the same horizontal scale.

In another aspect, each of the list formatted tiles has a vertical scale that is optimized for the RDS associated with that tile.

In another aspect, the receiving information on first clusters, which are selected as next classification targets from among the plurality of first clusters includes displaying, on a second display region, RDSs of all the selected first clusters so as to overlap with one another in a common amplitude scale and in a common time scale.

In another aspect, the receiving information on the first clusters that are selected as next classification targets from among the plurality of first clusters includes displaying, on a third display region, any one of the EDSs belonging to the selected first clusters.

In another aspect, displaying, on a third display region, any one of the EDSs belonging to all the selected first clusters includes displaying the EDSs belonging to all the selected first clusters one by one through use of a first control button in the order of time at which the EDSs were input.

In another aspect, the displaying of the EDSs belonging to all the selected first clusters one by one through the use of the first control button in the order of time at which the EDSs were input further includes repeatedly displaying, when a second control button is pressed, the EDSs belonging to all the selected first clusters in a persistence display.

In another aspect, each of the EDSs includes a vectored-valued function of time.

In another aspect, each of the EDSs includes a plurality of images that change over time.

DETAILED DESCRIPTION

Figure 1:
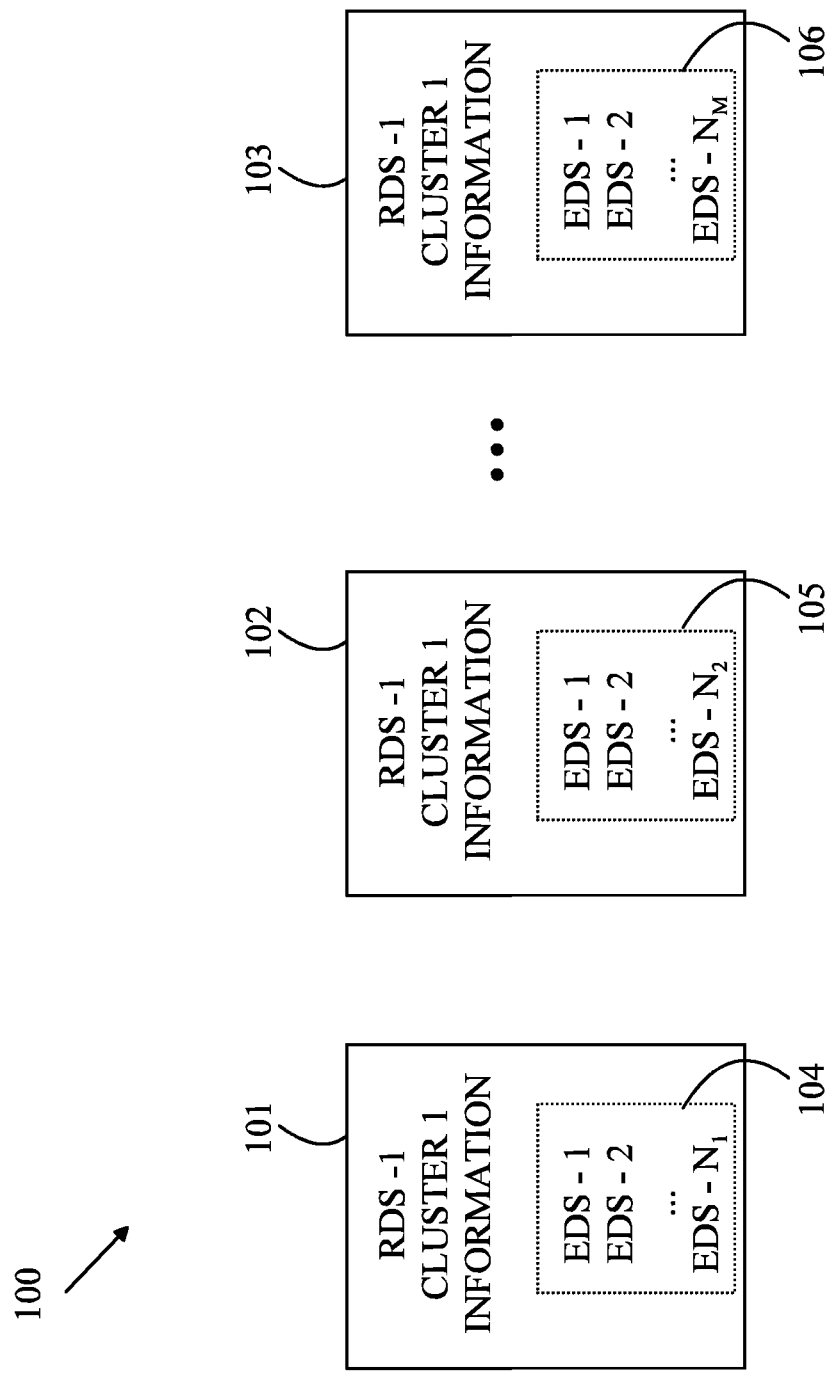
FIG. 1 illustrates a data structure used in one embodiment of the present invention.

Consider a set of objects in which each object is characterized by a signature. For example, consider objects that are sequences of recorded signal values that satisfy some extraction condition that was used to identify the objects in the recorded stream. The signature corresponding to an object may be the signal values themselves, some transformation of the signal values, such as the coefficients of a Fourier transform of the signal as a function of time, or some other transformation of the signal values. In general, the signature corresponding to an object will be a multi-valued quantity; hence, the signature can be viewed as a vector having a plurality of components.

In many cases, the goal of the clustering procedure is to discover clusters of objects in a coordinate system in which each axis corresponds to a different one of the signature components. Each object can be viewed as a point in that coordinate system. In general, there is a relationship defined between two signatures that provides a measure of the similarity of the two signatures. A cluster is typically defined to be a group of objects that are similar to one another as judged by the similarity measurement.

For example, the similarity measure might be the distance between the two signatures in the signature space. All objects that have a similarity measure that is less than some predetermined threshold from one of the objects are defined to be in the same cluster.

The manner in which the present invention provides its advantages can be more easily understood with reference to a data logging system in which a signal in an incoming data channel is digitized and stored on a memory device such as a disk drive. The data stream can be viewed as containing signals of interest that are defined by an "extraction algorithm" that identifies a sequence of the signal values that is of interest as the EDS.

In general, a user of the recorded data needs to be able to understand the various signals in the data and retrieve signals of interest. For the purpose of this discussion, it will be assumed that the user does not have a detailed knowledge of all the signals in the data stream of interest. In addition, it will be assumed that the number of data stream signals is too large for the user to review one at a time. Hence, the user needs to be able to comprehend important features of signals without looking at the entire data stream. For this purpose, it is effective to define clusters of similar signals. By examining representative members of such clusters, the user can gain a better knowledge of the signals that are recorded and specify the parameters needed to retrieve signals of interest and combine selected clusters based on viewing the signals corresponding to the clusters.

The present invention provides a user with tools that allow the user to define clusters in the collection of signals that have been recorded based on a similarity algorithm. The similarity algorithm computes a similarity measure related to the similarity between two signals. Algorithms for clustering objects based on a similarity measure are known to the art. Unfortunately, the computational workload inherent in applying many of these algorithms is of order $N^2$ or higher, where N is the number of signals. Given that a recorded data stream of several terabytes may have more than several million signals, clustering the recorded signals in a period of minutes while the user explores the signals is often not practical unless some mechanism for reducing the number of signals that must be clustered at once is provided.

As will be explained in more detail below, small clusters of signals of interest are detected during the recording process or during the playback of a data stream that has been previously recorded. These small clusters are then combined using the present invention to provide larger clusters that coincide with the clusters of signals in the input data stream. The small clusters are constructed without requiring a detailed predetermined description of the signals that are to be clustered. Ideally, each of these clusters contains a portion of a single cluster of the underlying signals that are present in the input stream. Each cluster is started from an observed signal in the input stream as discussed below. The size of the cluster is determined by a similarity algorithm that includes a threshold value that determines whether a second signal is to be included in the same cluster as a first signal. The manner in which the clusters are combined or in which a cluster is broken into smaller clusters will be discussed in more detail below.

To simplify the following discussion, it will be assumed that the signals of interest are the raw data values and the "signature" for each signal of interest is the vector of signal values. Other cases will be discussed in more detail below. It is assumed that the data stream primarily consists of individual signals separated by regions that do not include data segments of interest. Data stream segments that satisfy the extraction algorithm will be referred to as EDSs.

Ideally, each EDS would contain the data samples corresponding to one signal of interest without any background samples. However, there is usually a need to identify the EDS in a short period of time, and hence, this need constraints the extraction algorithm. There are numerous computationally efficient methods for detecting the beginning of some signal that differs from the background known to the art. For example, the extraction algorithm can look for a rising or falling edge. Detecting the point at which the signal returns to the background level, however, is computationally more complex, particularly in the presence of noise. Accordingly, an extraction algorithm in which the end of the signal of interest is defined to be a fixed number of samples relative to the beginning of the signal is preferred as the algorithm for defining an EDS. If two signals were in fact the same, the EDSs for the two signals would still match. Hence, in one exemplary embodiment, it is assumed that the data stream primarily consists of individual signals separated by regions that do not include data segments of interest. If this approximation interferes with the final clustering, the EDSs can be retrieved from the long-term storage and a clustering based on a more exact end of the signal can be utilized.

A "similarity measure" is also defined for the EDSs by a similarity algorithm. The similarity measure reflects the degree of similarity between any two EDSs. The similarity measure allows the system to group extracted data segments into clusters of EDSs that are similar to one another. In one aspect, the similarity algorithm includes a threshold value. If the similarity measure has a predetermined relationship with a threshold value, the two EDSs are defined to be similar to one another. For example, the two EDSs could be defined to be similar to one another if the similarity measure is less than the threshold value. EDSs that are similar to one another are grouped in a cluster.

When a new EDS is found, the system determines whether the EDS is part of a cluster that has already been found. If the EDS is part of an existing cluster, the existing cluster is updated to reflect the addition of the new EDS. If the EDS is not sufficiently similar to any of the existing clusters, a new cluster is defined and the EDS is added to that cluster.

Each cluster is represented by a RDS. If a new EDS is similar to an existing RDS, the new EDS is tagged as belonging to the cluster represented by that RDS. If the new EDS is not similar to any of the existing RDSs, a new cluster is defined for that EDS and that EDS becomes the RDS for the new cluster.

Refer now to FIG. 1, which illustrates a data structure used in one embodiment of the present invention. Data structure 100 includes one block for each of the extracted clusters described above. Exemplary blocks are shown at 101-103. Each block includes the RDS associated with the corresponding cluster and other information about the cluster such as the number of EDSs in the cluster and information on the similarity measure used to generate the cluster. Each block also includes the EDSs that were found to be similar to the RDS. Exemplary EDSs are shown at 104-106. The EDSs may be stored as the corresponding string of data values or as pointers to a memory location that contains the raw data values.

While the above-described examples provide one method for acquiring the clusters of EDSs and the RDS associated with each cluster, other methods for providing the representative EDS corresponding to each cluster can be utilized. The RDS described above is the first EDS that could not be assigned to any existing cluster. However, once a cluster has been defined, the choice of RDS for that cluster can be determined by other means. For example, the RDS can be chosen by a statistical method involving, for example, calculating similarities among all the EDSs belonging to each cluster by using an evaluation function, for example, a Euclidean distance, and selecting a RDS as the representative EDS by taking medians of those results. For the purposes of the present disclosure, any method for defining a RDS for a cluster of EDSs can be utilized.

Figure 2:
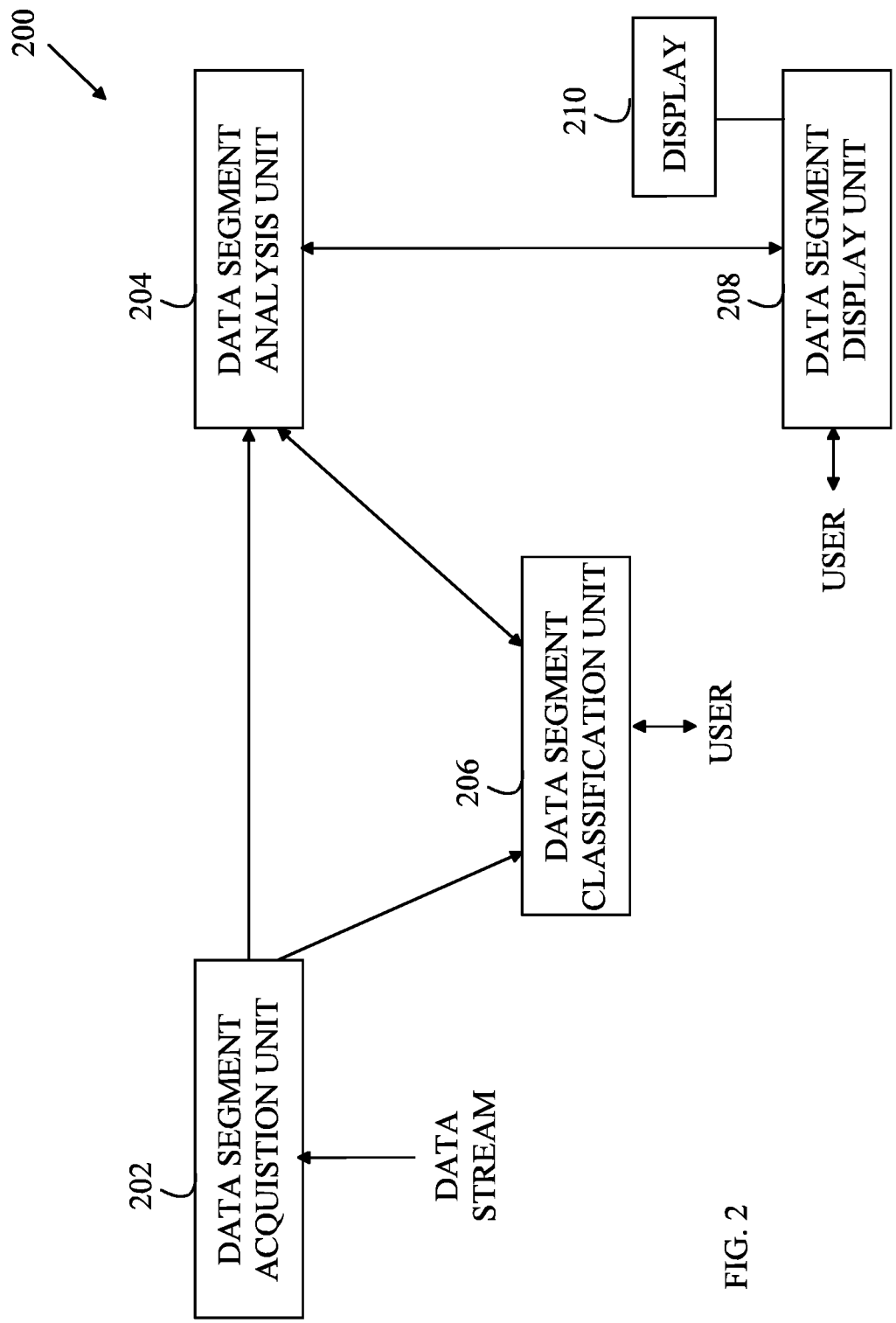
FIG. 2 illustrates the components of a data analysis system according to one embodiment of the present invention.

Refer now to FIG. 2, which illustrates the components of a data analysis system according to one embodiment of the present invention. The analysis system 200 includes an EDS acquisition unit 202, an EDS analysis unit 204, an EDS classification unit 206, and an EDS display unit 208. EDS acquisition unit 202 is configured to acquire an input data stream from which the EDSs are to be extracted. The source of the data stream could be a measurement device or a data recorder that is playing back a previously recorded data stream. EDS acquisition unit 202 extracts the EDSs from the acquired input, classifies the EDSs into preliminary clusters with the aid of EDS classification unit 206, and stores the result in the memory structure shown in FIG. 1. In one aspect of the invention, an extraction condition is used to identify data segments that are to become EDSs.

EDS display unit 208 operates to receive data from EDS analysis unit 204 and display the data on the display 210 that is part of EDS display unit 208. EDS display unit 208 is also configured to receive user input specifying the manner in which the data is to be displayed and instructions as to various processing steps including re-clustering of the EDSs in the current clusters.

For example, when classification for further narrowing the classification is required in response to the result of classification, the user notifies the EDS display unit 208 of a new classification parameter. Then, the EDS classification unit 206 receives the instruction, executes the instruction, and updates information on a cluster within a memory region, to thereby narrow down the result.

In one exemplary embodiment, the EDSs are preliminarily classified by EDS acquisition unit 202. Subsequently, in response to user input, one or more of the clusters may be processed to find a better RDS for that cluster, to split the cluster into multiple clusters, or to combine clusters. In addition, the clusters can be hierarchically combined using the same similarity algorithm of a different algorithm. Also, the EDSs can be processed to provide a signature for each EDS in a cluster and reclassified using the signatures and a different similarity algorithm or threshold.

Figure 3:
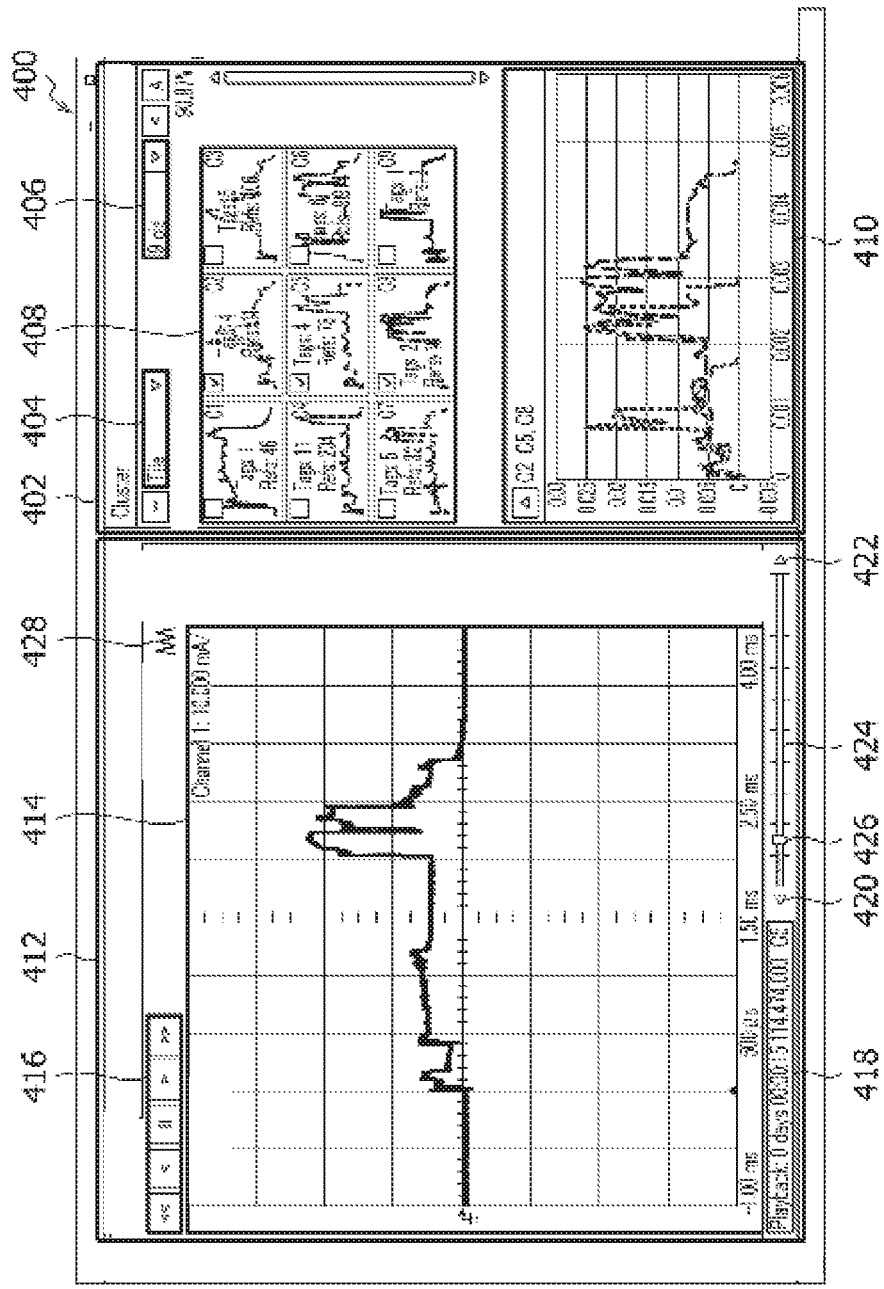
FIG. 3 illustrates the basic screen used to communicate with the user in EDS display unit 208.

Refer now to FIG. 3, which illustrates the basic screen used to communicate with the user in EDS display unit 208. Screen 400 has three sub-displays shown at 402, 410, and 412. Cluster selection sub-display 402 will be referred to as the cluster selection sub-display. Cluster sub-display 410 will be referred to as the selected cluster sub-display, and EDS sub-display 412 will be referred to as the EDS display.

Cluster selection sub-display 402 contains a plurality of panes, one for each of the clusters in the current collection of clusters. The current collection of clusters may include new clusters generated from the preliminary clusters. An exemplary pane is labeled at 408. In this example, each pane includes a display of the RDS associated with that cluster, a check box that the user can use to select that cluster, and information about the number of EDSs in the cluster.

The particular display format for cluster selection sub-display 402 is specified in a pull-down menu 404. In this example, a tiled display is selected. In a tiled display, the panes for each cluster include a display of the RDS for that cluster in a format that is optimized to provide the greatest detail for the RDS within the space allocated for each pane. Hence, the vertical and horizontal axes of the graph of the RDS are set to be substantially equal to the horizontal and vertical extent of the RDS. As a result, two RDSs cannot necessarily be compared by comparing the displays in their respective panes. Other display formats that allow such direct comparisons will be discussed below.

In general, a tiled display has a plurality of rows and columns of panes. Each row has a plurality of panes. If the number of clusters requires more rows than available in the display space, the lines of panes can be scrolled. The cluster selection sub-display also includes a menu 406 that allows the user to specify the count of the number of clusters to be displayed in the sub-display without scrolling the lines of the sub-display.

As noted above, each pane in cluster selection sub-display 402 includes a checkbox that allows the user to select the cluster corresponding to that pane for further processing. Each of the selected clusters is displayed in selected cluster sub-display 410. The RDSs corresponding to each of the selected clusters are displayed in an overlapping display in which the common overlapping display horizontal axis is the same for all of the RDSs, and the vertical scale is chosen to be sufficient to allow all of the selected RDSs to be displayed within the sub-display. Hence, the user can better compare the selected clusters.

In one aspect of the present invention, the user can specify that the selected clusters are to be combined using hierarchical clustering into a specified number of clusters. In one aspect, a new RDS is selected for each of the newly created clusters. The newly created clusters are then added to the list of clusters displayed in cluster selection sub-display 402 and the clusters that were combined to provide the new clusters are removed.

In another aspect of the invention, a single cluster can be selected, and EDS classification unit 206 can receive an instruction from the user to re-classify the EDSs of that cluster into multiple clusters by using a new similarity measure. For example, the original similarity algorithm could be used with a more restrictive threshold.

In another re-classification example, the EDSs of the selected cluster can be analyzed to find a more accurate end point than the end point used in the preliminary data segment extraction. As noted above, in one aspect, the extraction algorithm selects a predetermined number of data samples relative to the trigger that initiated the extraction. In this aspect, each EDS is examined to determine if a more accurate estimate of the number of samples that are actually in the segment of interest can be determined. The more accurate estimate is then used to define the end point of the EDS. This analysis can lead to clusters in which the EDSs have different lengths. The lengths can then be used to re-classify the cluster into a number of clusters, each new cluster having a length within a range of lengths, with different clusters having different ranges.

The above-described displays operate on the RDSs associated with each of the clusters. While a RDS is also an EDS, the other EDSs in a cluster may be of importance to a user in understanding the data stream. EDS sub-display 412 allows the user to view the individual EDSs belonging to the selected cluster. In this embodiment, the EDSs are displayed one at a time. Each EDS has a unique identifier. In the present example, the identifier is a time stamp representing the time in the data stream at which that EDS appeared. Hence, the EDSs have an order. The EDSs are displayed in an EDS sub-display by specifying an EDS using that EDS's identifier.

A detailed EDS is displayed on pane 414 of the EDS sub-display 412. An EDS position indicator 418 displays, for a currently displayed EDS, information (0 days 00:00:15. 114,474,000) on a start point and end point with respect to a temporal location in the original data stream and the number of data points in the EDS, and an associated cluster name (C5). A time bar 424 and a current position indicator 426 indicate the location of the currently displayed EDS in the time bar 424 by the current position indicator 426. A left-triangle arrow icon 420 and a right-triangle arrow icon 422 are movement instruction buttons to be used for moving the position of the current position indicator 426 by one EDS. Further, on a top left block 416 on the sub-display, operation control buttons, namely, "reverse playback", "one EDS back", "stop", "one EDS forward", and "playback" are provided from the left in the stated order, and those buttons can be used to display an EDS at a desired position. On the detailed EDS sub-display 412, any one of the EDSs belonging to any of the selected clusters is displayed, and the operation control buttons represented by the block 416 can be used for display of "one EDS forward", "one EDS back", "repeated playback of all the EDSs", or "repeated reverse playback of all the EDSs".

An icon 428 specifies whether a one-screen display mode or a two-screen display mode for EDS sub-display 412 is active. The two-screen display mode will be discussed in more detail below.

In the embodiment shown in FIG. 3, region 408 was populated by a tiled display of the RDSs of the clusters. In the title display, the horizontal and vertical axes of the graphs were chosen to maximize the details of the RDSs. Hence, the horizontal and vertical scales are different from plot to plot. While this arrangement provides the greatest visibility for each RDS in the available space, in some applications the difference in the scales may make it difficult for the user to fully comprehend the different RDSs. To address this issue, the present invention provides a "list mode" in which the horizontal scales are the same from plot to plot.

Figure 4:
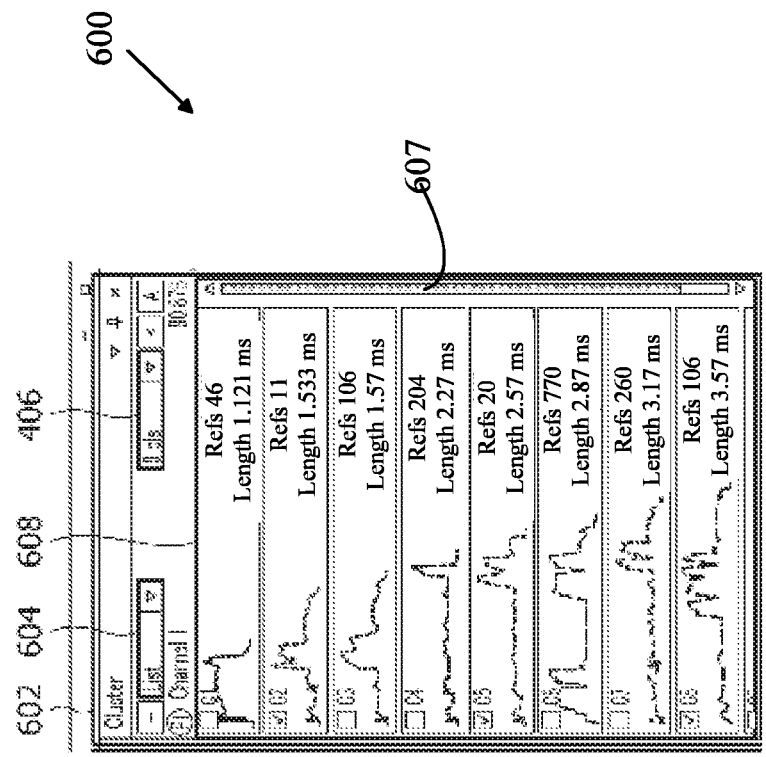
FIG. 4 illustrates an embodiment of the cluster selection sub-display 402 in which the list mode is used.

Refer now to FIG. 4, which illustrates an embodiment of the cluster selection sub-display 402 in which the list mode is used. List display 600 replaces pane 402 shown in FIG. 3. The classification result display screen 602 utilizes a list display that was chosen by selecting the "list" mode from pull-down menu 604. The representative plots of respective clusters and the numbers of EDSs of elements of the respective clusters are displayed in line vertically in a format of displaying a list in a manner analogous to that described above with reference to FIG. 3. Since all nine clusters cannot be displayed at the same time on the list display, a scroll bar 607 is displayed on the right side of the display 608. The display of each cluster includes a checkbox for checking whether or not to select the cluster, a RDS, a length indicating the length of the RDS, and the number (Refs) of EDSs contained in that cluster. The remaining sub-displays shown in FIG. 3 operate in an analogous manner when the list mode is selected, and hence, those sub-displays are not shown in FIG. 4.

Figure 5:
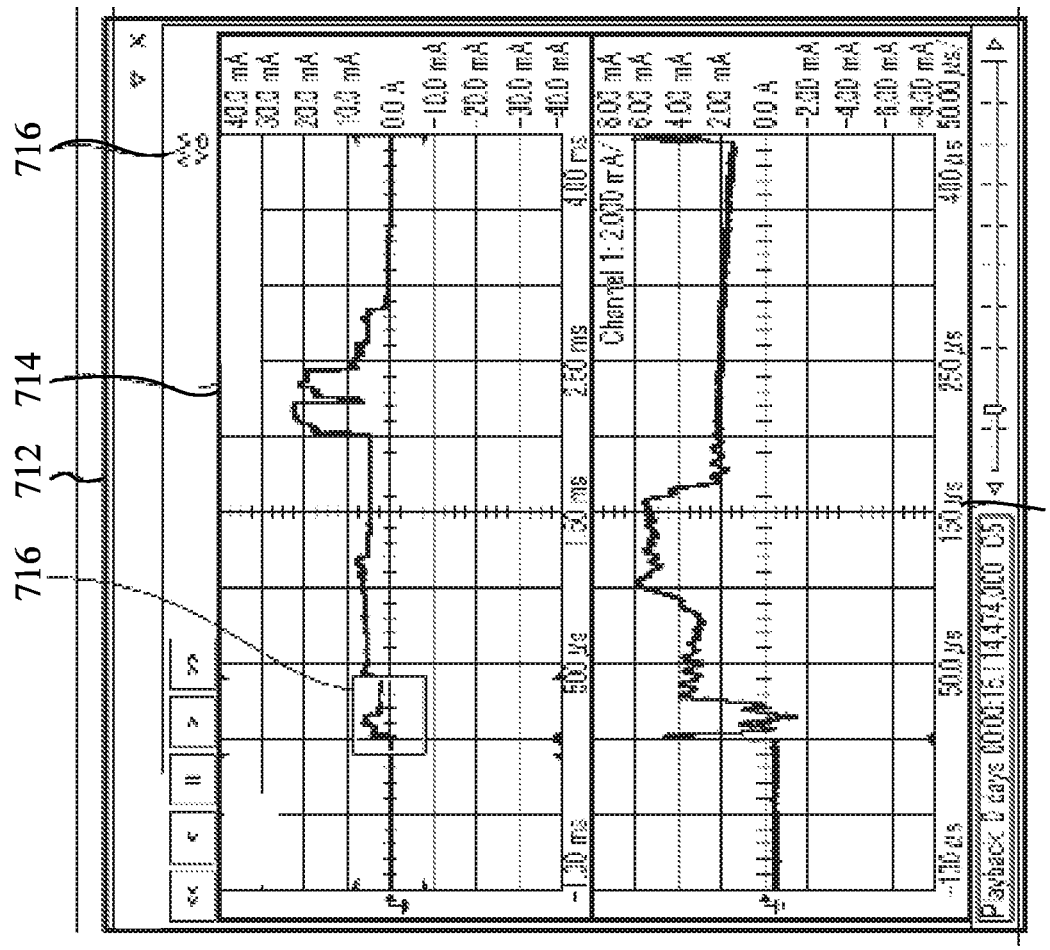
FIG. 5 illustrates an embodiment of the present invention in which an EDS sub-display 412 is replaced by sub-display 712.

In the above-described embodiments, the detailed EDS sub-display 412 displayed a single view of a single EDS. However, embodiments in which the EDS sub-display has multiple displays can also be constructed. Refer now to FIG. 5, which illustrates an embodiment of the present invention in which an EDS sub-display 412 is replaced by sub-display 712. To simplify the drawing, only the EDS sub-display is shown, the remaining sub-displays operate as described above.

This two-pane mode is selected by clicking an icon shown at 716. In this two-pane display mode, pane 714 displays the currently selected EDS chosen in the manner described above with reference to FIG. 3. Pane 720 displays a detailed view of the portion 716 of the display in pane 714 that is selected by the user using the pointing device associated with the user interface.

In another aspect of the invention, the user can view selected EDSs repeatedly in a overlaid display which allows the user to view EDSs chronologically in a manner that allows the user to watch each EDS "evolve" into the next EDS in the sequence. In this embodiment, the user selects the clusters containing the EDSs that are to be displayed. The individual EDSs of the selected cluster or clusters are then displayed. This display mode is analogous to a persistence display in an oscilloscope.

For the purposes of the present disclosure, a "persistence display" is defined to be a display having the following properties. All of the selected EDSs are displayed using the same horizontal and vertical axes as if a single overlapped display were to be created. However, each EDS is "painted" on this display screen for a finite period of time in which the EDS is displayed initially in a high intensity mode for a first period of time and then fades via lower intensity displays until it disappears from the screen. The time needed to sequentially initiate each of the individual EDS displays is referred to as a display cycle. The display cycle is divided into N display intervals, where N is the number of EDS to be displayed. At the start of each interval, the next EDS in the sequence commences its display. The time over which any given EDS is visible on the screen is longer than a display interval; hence, the display evolves from one EDS to the next EDS. In one aspect, the EDSs are presented in the chronological order they appeared in the original data stream, and each EDS is visible for at least three display intervals.

In other embodiments, the user can select the order in which the EDSs are displayed. For example, if the various clusters are further clustered using hierarchical clustering, the RDSs for each cluster can be displayed in an order that represents the evolution of the RDSs up the hierarchical clustering tree.

In the above-described embodiments, the input data stream was scalar in nature. That is, it consists of a single value on each clock cycle. However, the teachings of the present invention can be applied to vector input data streams. In a vector-valued input data stream there are a plurality of scalar values for each time point. Such a data stream can be presented as a plurality of input data channels in which each channel is processed by an ADC to provide an input vector on each clock cycle. In another example, the plurality of data points for each time point is generated by transforming a scalar valued input stream. For example, a time domain input signal can be transformed into a frequency domain signal by filtering the time domain input stream with a band pass filter to generate an amplitude of a frequency component as a function of time. A plurality of such filters will provide a three-dimensional input stream in which the first dimension is time, the second dimension is frequency, and the third dimension is amplitude of the frequency component. The trigger circuit that defines a start of a new EDS can operate on one of the channels or a plurality of the channels.

The user interface of the present invention can be applied to such vector-valued input streams provided a suitable format can be defined for displaying the resultant EDSs and RDSs. In the case of a vectored value data stream with two components for each time point, a three-dimensional display can be utilized in which the first axis is time, the second axis is one of the two components and the third axis is a third component. The third axis may be displayed as a density value such that the resulting display resembles a photograph with the gray level representing the third value. Alternatively, the display could be a perspective view of a three-dimensional surface. In the case of a three component vector, the fourth component can be coded as a color such that each dot in the picture has both a color and an intensity.

Figure 6:
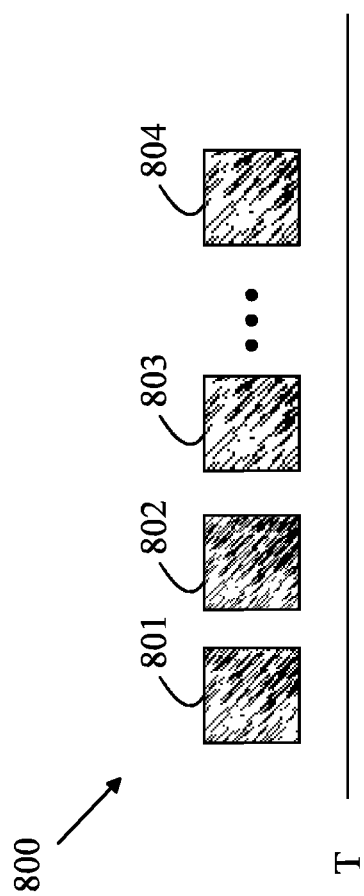
FIG. 6 illustrates a possible screen display for an EDS.

In another example, the data stream consisting of three-dimensional objects such as conventional images, the time axis can be presented as a sequence of the images. Refer to FIG. 6, which illustrates a possible screen display for such an EDS. EDS 800 would then be a sequence of consecutive images 801-804 that satisfied some extraction condition, such as a scene change. A zoomed in display of such a string of images could be a single image or part of a single image, as well as a sub-set of the string of images. It should be noted that the four-dimensional display discussed above could also be implemented as a string of three-dimensional displays.

A similarity function between two images for clustering images could be implemented as a cross-correlation between the images or a cross-correlation between the two images with one image shifted with respect to the other. It should also be noted that a sequence of images is a special case of a vector-valued input data stream in which each "vector" has N×M components which are the pixels of the N×M pixel images.

All of the other features described above with respect to the embodiments in which the RDSs are displayed as two-dimensional graphs can be utilized with such a three-dimensional display in place of the two-dimensional displays.

Refer again to FIG. 2. While EDS classification unit 206 is shown as separate from EDS analysis unit 204, EDS classification unit 206 can be implemented as part of a general purpose computer with EDS display unit 208 also being part of that general purpose computer. The memory block that stores the cluster information can be implemented in the memory of the general purpose computer or in external storage devices connected to that computer.

The implementation of the EDS acquisition unit 202 can be implemented as an analog input channel to the general computer if the data rates are sufficiently low. In the case in which the data stream is pre-recorded in digital form, EDS acquisition unit 202 is preferably an input channel of the general purpose computer. Alternatively, EDS acquisition unit 202 can be implemented in separate hardware analogous to the input section of an oscilloscope. Input hardware of this type can include multiple sampling and digitizing circuits that operate in parallel, and hence, are capable of very high data input rates.

The conventional computer can also advantageously be implemented as a multi-processor. The matching of the EDSs to each other in the various clustering and re-clustering operations is a process that can be increased in speed by utilizing a multi-processor, since the results of a match between two EDSs can be carried in parallel with a match between two other EDSs without interfering with the match to the original two EDSs. The multi-processor can be a conventional multiple core computer or a graphic processing board having thousands of cores.

The present invention also includes a computer readable medium that stores instructions that cause a data processing system to execute the method of the present invention. A computer readable medium is defined to be any medium that constitutes patentable subject matter under 35 U.S.C. 101 and excludes any medium that does not constitute patentable subject matter under 35 U.S.C. 101. Examples of such media include non-transitory media such as computer memory devices that store information in a format that is readable by a computer or data processing system.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for operating a data processing system, having a user interface and a display, to enable a user to analyze a plurality of EDSs, said method comprising:
   causing said data processing system to receive a plurality of first EDSs classified into a plurality of first clusters and a first RDS for each of said plurality of first clusters, said first RDS for each of said plurality of first clusters being one of said EDSs in that one of said plurality of first clusters, each of said plurality of first EDSs being a data segment that was automatically extracted from a data stream comprising an ordered sequence of data values based on said data values in that data stream;
   displaying, on a first display region of said display, a first display for each of said plurality of first clusters and a said RDS for that one of said plurality of first clusters;
   receiving information from a user specifying one or more of said plurality of first clusters to be further clustered to arrive at a specified number of second clusters into which said specified one or more first clusters are to be classified;
   performing a second clustering of said one or more plurality of first clusters to arrive at said specified number of second clusters; and
   displaying, on said first display region, a second display comprising a second display for each of said second clusters, each second display comprising an RDS representing that second cluster, said RDS being one of said EDSs in that second.

2. The method of claim 1 wherein said first display comprises a number of EDSs belonging to each of the plurality of first clusters.

3. The method of claim 1 wherein said second clustering comprises a hierarchical clustering method.

4. The method claim 1, wherein said first display comprises, for each of said plurality of first clusters, a first RDS of each of the plurality of first clusters and a number of EDSs belonging to each of the plurality of first clusters includes arranging and displaying the first RDS and said number of EDSs in a format of a plurality of tiles horizontally for said plurality of first clusters.

5. The method of claim 4 wherein each of said plurality of tiles is characterized by a horizontal display range and a vertical display range and where said horizontal and vertical display ranges are set independently for each of said plurality of tiles such that said first RDS displayed in that tile occupies substantially all of said horizontal and vertical display ranges.

6. The method claim 1 wherein said first display comprises, for each of said plurality of first clusters, a first RDS of each of the plurality of first clusters and a number of EDSs belonging to each of the plurality of first clusters includes arranging and displaying the first RDS and the number of EDSs in a format of a plurality of list formatted tiles vertically arranged for said plurality of first clusters.

7. The method of claim 6 wherein each of said plurality of list formatted tiles has the same horizontal scale.

8. The method of claim 7 wherein each of said plurality of list formatted tiles has a vertical scale that is optimized for said RDS associated with that tile.

9. The method of claim 1 wherein the receiving information on said plurality of first clusters that are selected as next classification targets from among the plurality of first clusters includes displaying, on a second display region, RDSs of all the selected first clusters so as to overlap with one another in a common amplitude scale and in a common time scale.

10. The method of claim 1 wherein the receiving information on said first clusters that are selected as next classification targets from among said plurality of first clusters includes displaying, on a third display region, any one of said plurality of EDSs belonging to said selected first clusters.

11. The method of claim 10 wherein said displaying, on a third display region, any one of said EDSs belonging to all the selected first clusters includes displaying said EDSs belonging to all the selected first clusters one by one through the use of a first control button that displays said EDSs in an order determined by a time at which said EDSs were input.

12. The method of claim 10 wherein said displaying of said EDSs belonging to all said selected first clusters one by one through said use of a first control button further comprises repeatedly displaying, when a second control button is pressed, said EDSs belonging to all said selected first clusters in a persistence display.

13. The method of claim 1 wherein each of said EDSs comprises a vectored-valued function of time.

14. The method of claim 13 wherein each of said EDSs comprises a plurality of images that change over time.

15. A computer readable medium containing instructions that cause a data processing system to execute a method when loaded into said data processing system, said method causing said data processing system to enable a user to analyze a plurality of EDSs, said method comprising:
    causing said data processing system to receive a plurality of first EDSs classified into a plurality of first clusters and a first RDS for each of said plurality of first clusters, said first RDS for each of said plurality of first clusters being one of said EDSs in that one of said plurality of first clusters, each of said plurality of first EDSs being a data segment that was automatically extracted from a data stream comprising an ordered sequence of data values based on said data values in that data stream;
    displaying, on a first display region of said display, a first display for each of said plurality of first clusters and a said RDS for that one of said plurality of first clusters;
    receiving information from a user, specifying one or more of said plurality of first clusters to be further clustered to arrive at a specified number of second clusters into which said specified one or more first clusters is to be classified;
    performing a second clustering of said one or more plurality of first clusters to arrive at said specified number of second clusters; and
    displaying, on said first display region, a second display comprising a second display for each of said second clusters, each second display comprising an RDS representing that second cluster, said RDS being one of said EDSs in that second cluster.

16. The computer readable medium of claim 15, wherein said first display comprises, for each of said plurality of first clusters, a first RDS of each of the plurality of first clusters and a number of EDSs belonging to each of the plurality of first clusters includes arranging and displaying the first RDS and said number of EDSs in a format of a plurality of tiles horizontally for said plurality of first clusters.

17. The computer readable medium of claim 15, wherein the receiving information on first clusters, which are selected as next classification targets from among the plurality of first clusters includes displaying, on a second display region, RDSs of all the selected first clusters so as to overlap with one another in a common amplitude scale and in a common time scale.

18. The computer readable medium of claim 15, wherein the receiving information on said first clusters that are selected as next classification targets from among said plurality of first clusters includes displaying, on a third display region, any one of said EDSs belonging to said selected first clusters.

19. The computer readable medium of claim 15, wherein each of said EDSs comprises a vectored-valued function of time.

20. The computer readable medium of claim 19, wherein each of said EDSs comprises a plurality of images that change over time.

* * * * *

UNITED STATES PATENT AND TRADEMARK OFFICE
CERTIFICATE OF CORRECTION

PATENT NO. : 11,100,365 B2  
APPLICATION NO. : 16/459425  
DATED : August 24, 2021  
INVENTOR(S) : Naoki Kobayashi et al.

Page 1 of 1

It is certified that error appears in the above-identified patent and that said Letters Patent is hereby corrected as shown below:

In the Claims

In Column 10, Line 46, in Claim 1, after "and" delete "a".

In Column 10, Line 60, in Claim 1, delete "second." and insert -- second cluster. --, therefor.

In Column 12, Line 14, in Claim 15, after "and" delete "a".

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*